United States Patent Office
3,546,276
Patented Dec. 8, 1970

3,546,276
β-AMINO - β,β - BIS(FLUOROALKYL)CARBONYL
COMPOUNDS AND PROCESS FOR PREPARING
THE SAME
David M. Gale, Wilmington, Del., assignor to E. I. du
Pont de Nemours and Company, Wilmington, Del., a
corporation of Delaware
No Drawing. Filed Oct. 22, 1965, Ser. No. 502,611
Int. Cl. C07c 101/00, 121/42
U.S. Cl. 260—482                     4 Claims

ABSTRACT OF THE DISCLOSURE

Fluoroalkylideneimines can be reacted with compounds containing a methylene group activated by an adjacent carbonyl group in the presence of a Friedel-Crafts catalyst to give β-amino-β,β-bis(fluoroalkyl)carbonyl compounds. The β-amino-β,β-bis(fluoroalkyl)carbonyl compounds are useful as degreasing agents for metals.

DESCRIPTION OF THE INVENTION

This invention relates to fluorinated compounds containing amino and carbonyl groups, and to their preparation. More specifically, this invention relates to certain β-amino,β,β-bis(fluoroalkyl)carbonyl compounds and their preparation.

The novel compounds of this invention are represented by the formula $$H_2N-\underset{CF_2R^2}{\overset{CF_2R^1}{C}}-CH\underset{COR^4}{\overset{R^3}{\diagup}}$$

wherein $R^1$ and $R^2$ each represent fluorine, chlorine, perfluoroalkyl, ω-chloroperfluoroalkyl or ω-hydroperfluoroalkyl, in which each alkyl group contains 1–6 carbon atoms; $R^3$ is —CN or $$-\overset{O}{\underset{\|}{C}}-O-\text{hydrocarbyl}$$

$R^4$ is hydrocarbyl or O-hydrocarbyl, each hydrocarbyl group containing 1–8 carbon atoms and being free of aliphatic unsaturation; and $R^3$ and $R^4$ together represent the group $-(CH_2)_n-$ where $n$ is 3 or 4.

The term "free of aliphatic unsaturation" means that there are no aliphatic double or triple bonds in the hydrocarbyl groups, i.e., the only unsaturation which may be present in these groups is aromatic unsaturation. Thus the hydrocarbyl groups include alkyl, aryl, aralkyl and alkaryl.

In general, the compounds of the invention are colorless liquids which exhibit good solvent properties.

The novel compounds of this invention can be prepared by reacting a fluoroalkylideneimine of the formula $$HN=C\diagdown\underset{CF_2R^2}{\overset{CF_2R^1}{\diagup}}$$

with an active methylene compound of the formula $$R^3CH_2COR^4$$

at a temperature between about 50–200° C. in the presence of a Friedel-Crafts catalyst. $R^1$ through $R^4$ are defined as previously. The reaction is carried out by mixing the imine, active methylene compound and catalyst under essentially anhydrous conditions at 50° to 200° C., and preferably between about 75° and 150° C. No solvent is necessary and preferably none is employed. However, if desired, inert solvents such as the aliphatic and cycloaliphatic hydrocarbons, e.g., hexane, octane, cyclohexane, or other solvents such as tetrachloroethane, tetrachloroethylene, carbon disulfide, and the like, may be employed.

The two reactants can be used in any desired molar ratio, but are preferably employed in ratios of 0.5–2.0 moles of active methylene compound per mole of imine. The Friedel-Crafts catalyst may be present in a molar ratio, based on the amount of imine used, between 0.01:1 and 0.25:1, depending upon the sensitivity of the reactants and products to acid catalyzed decomposition and on the ability of the product to complex with the catalyst. Catalysts which may be employed include aluminum chloride, aluminum bromide, boron trifluoride, boron trichloride, antimony pentachloride, zinc chloride, ferric chloride, hydrogen fluoride, stannous chloride, and the like. Time and pressure are not critical in the process, although 4–18 hours and autogenous pressure are usually employed.

The fluoroalkylideneimines used herein as reactants are obtained by reacting a polyfluoroketone with at least one molar equivalent of ammonia at −50° to 10° C. followed by dehydration of the resulting aminohydroxy polyfluoroalkane with a dehydrating agent in the presence of an acid acceptor, and then distilling to recover the imine. The imine reactant also may be prepared by reacting hydrazoic acid with a polyfluorothioketone. Both these aforedescribed methods are disclosed and claimed in the co-assigned patent application U.S. Ser. No. 250,501, filed Jan. 10, 1963. The first method for preparing the imine reactants is also described by Middleton et al. in J. Org. Chem. 30, 1398 (1965).

The examples which follow further illustrate the products and process of this invention. The reactor lining referred to in the examples as "Hastelloy" is a nickel-iron-molybdenum alloy.

EXAMPLE I $$\text{cyclohexanone} + (CF_3)_2C=NH \xrightarrow{ZnCl_2} \text{2-(2-aminohexafluoroisopropyl)cyclohexanone}$$

A mixture of 20 g. cyclohexanone, 1 g. of zinc chloride and 34 g. of hexafluoroisopropylideneimine was heated in a "Hastelloy"-lined autoclave for 8 hours at 125° C. The bomb was cooled and vented and the recovered product distilled through a spinning-band column. The resulting product, 24.4 g., was 2-(2-aminohexafluoroisopropyl)cyclohexanone, B.P. 80° C. (6 mm.), $n_D^{25}$ 11.4037.

Analysis.—Calc'd for $C_9H_{11}F_6NO$ (percent): C, 41.08; H, 4.22; F, 43.30. Found (percent): C, 41.86; H, 4.50; F, 42.65.

The infrared spectrum showed peaks at 2.93, 3.0, 6.19μ (—NH$_2$), 3.39, 3.48μ (saturated CH), 5.80μ (C=O) and strong CF$_3$ absorption.

The mass spectrum showed a parent peak at m/e 263 and the expected fragmentation.

2-(2-aminohexafluoroisopropyl)cyclopentanone can be obtained by the same procedure, substituting cyclopentanone for cyclohexanone. This compound is characterized by: B.P. 60–61° C. (55 mm.); $n_D^{25}$ 1.3880; and showed the elemental analysis:

Analysis.—Calc'd for $C_8H_9NOF_6$ (percent): C, 38.56; H, 3.50; N, 5.62; F, 45.57. Found (percent): C, 38.83; H, 3.74; N, 5.54; F, 45.57.

$F^{19}$ NMR showed a pair of quartets at +230 and +530 c.p.s. from $FCCl_2CCl_2F$ (J=9 c.p.s.).

EXAMPLE II

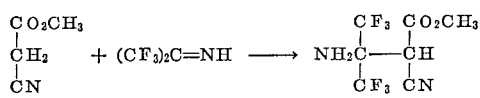

A mixture of 10 g. of methyl cyanoacetate, 2.6 g. of zinc chloride and 17 g. of hexafluoroisopropylideneimine was heated in a Hastelloy-lined autoclave at 100° for 8 hours. After cooling and venting the bomb the reaction mixture was combined with 3 g. of solid sodium bicarbonate and washed well with ether. Distillation of the ether washings afforded 7.6 g. of 2-carbomethoxy-3-amino-3-trifluoromethyl-4,4,4-trifluorobutyronitrile, B.P. 57–59° C. (0.75 mm.) The infrared spectrum showed bands at 2.92, 2.97 and 6.13μ for $NH_2$-absorption, a band at 4.41μ for $C \equiv N$ and at 5.67μ for $C=O$. The mass spectrum showed a major peak at the parent-$NH_3$ and was consistent with the assigned structure. The $F^{19}$ NMR showed an $A_3B_3$ multiplet (J=9) centered at +4222 c.p.s. (external $FCCl_3$ at 56.4 mc.) and the $H_1$ NMR showed —$NH_2$ at τ 7.3, $CH_3O$— at 6.11 and

at 5.70.

*Analysis.*—Calc'd for $C_7H_6N_2F_6O_2$ (percent): C, 31.82; H, 2.67; N, 10.61. Found (percent): C, 32.83; H, 2.52; N, 10.71.

EXAMPLE III

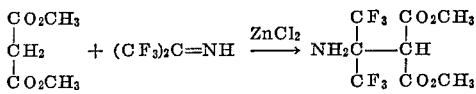

As per Example II, 60 g. of dimethylmalonate, 10.5 g. of zinc chloride and 84 g. of hexafluoroisopropylideneimine were heated at 100° for 8 hours.

There was obtained 18.9 g. of dimethyl (2-aminohexafluoroisopropyl)malonate, B.P. 54° C. (1 mm.). The $H^1$ NMR showed 2 $CH_3O$— at τ 7.28 and

at τ 6.03; the $F^{19}$ NMR showed a singlet at +4208 c.p.s. from external $FCCl_3$ at 56.4 mc.

*Analysis.*—Calc'd for $C_8H_9NO_4F_6$ (percent): C, 32.33; H, 3.06; N, 4.72; F, 38.35. Found (percent): C, 33.13; H, 3.30; N, 5.34; F, 38.22.

The following table provides additional specific examples of products of this invention which can be prepared by the described procedure.

TABLE

| Imine (catalyst) | Active methylene compound | Product |
|---|---|---|
| $(CF_2Cl)_2C=NH$ (ZnCl$_2$) | 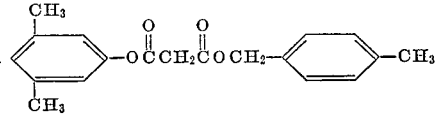 $CH_3CH_2OCCH_2CC_6H_5$ | 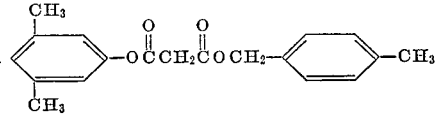 |
| $(CF_2HCF_2)_2C=NH$ (ZnCl$_2$) | $NCCH_2CCH_2(CH_2)_6CH_3$ | 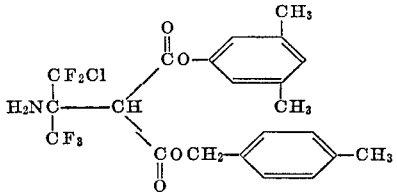 |
| $(ClCF_2)CF_3C=NH$ (ZnCl$_2$) | 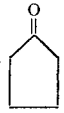 | 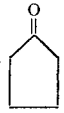 |
| $CF_3(CF_2)_6$<br>$\phantom{XX}$ C=NH<br>$CF_3(CF_2)_6$ (ZnCl$_2$) | $CH_3OC-CH_2CCH_3$ | 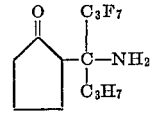 |
| $(C_3F_7)_2C=NH$ (ZnCl$_2$) | (cyclohexanone) | 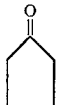 |
| $[ClCF_2(CF_2)_6]_2C=NH$ (BF$_3$) | $CH_3CH_2OCCH_2COCH_2CH_3$ | 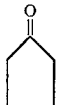 |
| $HCF_2CF_2$<br>$\phantom{XX}$ C=NH<br>$HCF_2(CF_2)_3$ (AlCl$_3$) | $C_6H_5CH_2OCCH_2COCH_2C_6H_5$ | 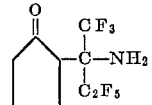 |
| $CF_3$<br>$\phantom{XX}$ C=NH<br>$C_2F_5$ (HF) | (cyclohexanone) | 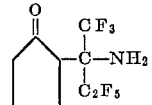 |

The products of the invention are useful as metal degreasing agents. They can be employed in the vapor phase either at atmopsheric or reduced pressure, or in the liquid phase at elevated temperatures. For example, strips were cut from a steel coupon containing an oily film to protect it from rusting. One strip was held in the vapors of the amine from hexafluoroisopropylideneimine and cyclohexanone for about a minute. Another strip was likewise treated with the amine from hexafluoroisopropylideneimine and dimethylmalonate. These strips, together with an untreated strip were placed in a beaker containing a few drops of water. The amine-treated strips rusted rapidly (in about 30 min.) while the untreated strip did not.

The embodiments of the invention in which an exclusive property or privilege is claimed are defined as follows:

1. Compounds represented by the formula:

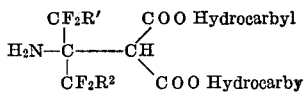

wherein hydrocarbyl in each instance is defined as of 1 to 8 carbon atoms free of aliphatic unsaturation and wherein R' and R² are each fluorine, chlorine, perfluoroalkyl, ω-chloroperfluoroalkyl or ω-hydroperfluoroalkyl, in which each alkyl is of 1–6 carbon atoms.

2. Compounds represented by the formula:

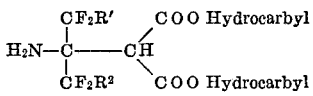

wherein hydrocarbyl in each instance is selected from alkyl, aryl, aralkyl and alkaryl groups of 1 to 8 carbon atoms and wherein R' and R² are each fluorine, chlorine, perfluoroalkyl, ω-chloroperfluoroalkyl or ω-hydroperfluoroalkyl, in which each alkyl is of 1–6 carbon atoms.

3. The compound of claim 2 having the formula

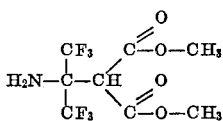

4. Process for preparing compounds of the formula

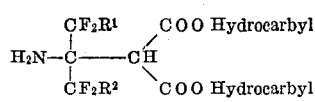

wherein:

$R^1$ and $R^2$ each are fluorine, chlorine, perfluoroalkyl, ω-chloroperfluoroalkyl or ω-hydroperfluoroalkyl, in which each alkyl is of 1–6 carbon atoms;

hydrocarbyl in each instance is defined as of 1–8 carbon atoms free of aliphatic unsaturation, which comprises reacting at a temperature between about 50–200° C. under essentially anhydrous conditions an imine compound of the formula

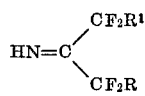

with from 0.5 to 2.0 moles per mole of said imine compound of a compound of the formula

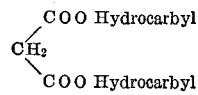

wherein $R^1$, $R^2$ and hydrocarbyl are as defined above in the presence of from 0.01 to 0.25 moles of a Friedel-Crafts catalyst per mole of said imine compound.

References Cited

Middleton, J. Org. Chem., 30, p. 1402 (1965).

JOSEPH P. BRUST, Primary Examiner

U.S. Cl. X.R.

130—40; 260—404, 465, 465.4, 465.5, 472, 563